April 1, 1958
J. H. FEIG ET AL
2,829,244
LIGHT FIXTURE
Filed March 29, 1956
2 Sheets-Sheet 1
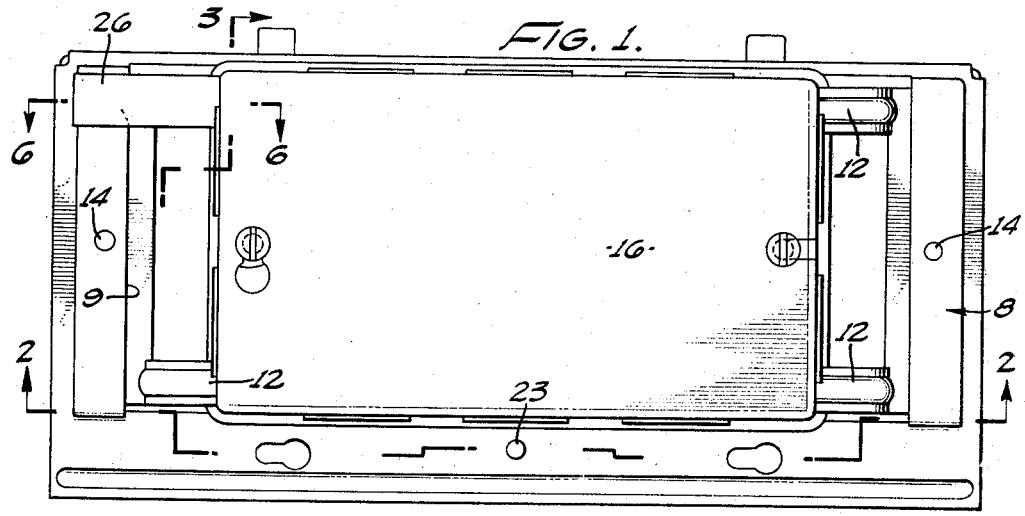
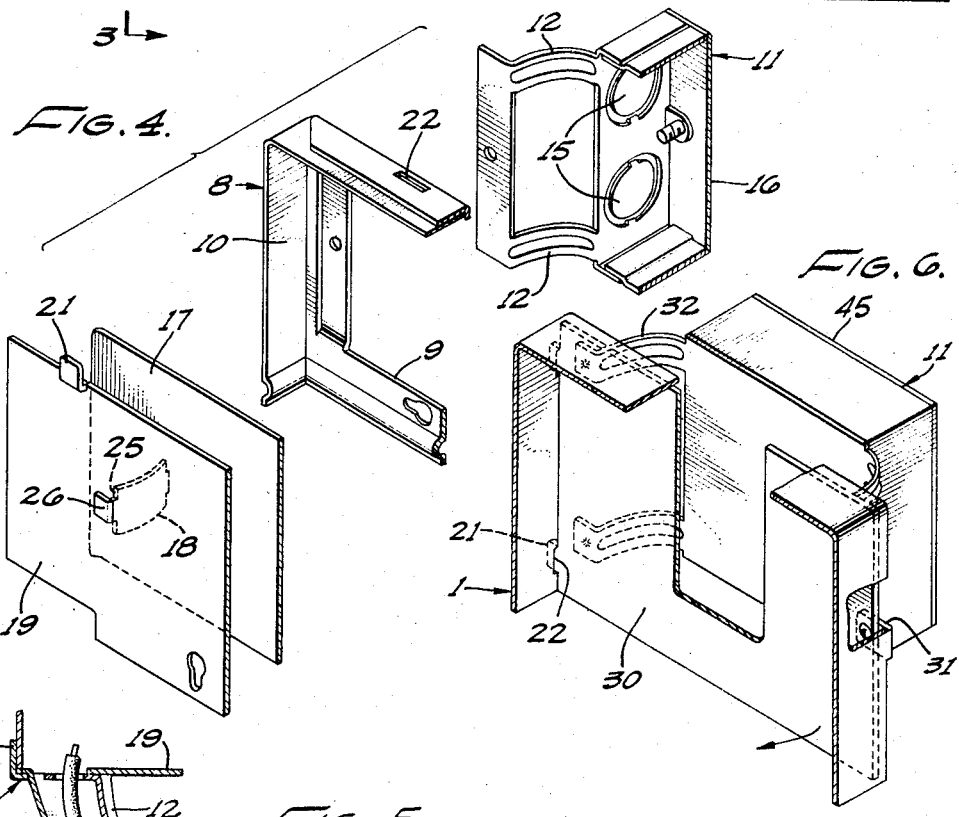
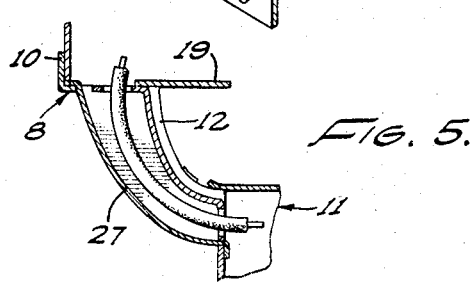
INVENTORS
JEROME H. FEIG, NORMAN E. DASHER
ROBERT S. FREMONT
BY
ATTORNEYS April 1, 1958

J. H. FEIG ET AL 2,829,244

LIGHT FIXTURE

Filed March 29, 1956

INVENTORS
JEROME H. FEIG, NORMAN E. DASHER,
ROBERT S. FREMONT
BY

*Lyon*  *Lyon*

ATTORNEYS

United States Patent Office 2,829,244
Patented Apr. 1, 1958

2,829,244

LIGHT FIXTURE

Jerome H. Feig, North Hollywood, and Norman E. Dasher, Burbank, Calif., and Robert S. Fremont, Lincolnwood, Ill., assignors to Marvin Electric Manufacturing Company, Los Angeles, Calif., a corporation of California Application March 29, 1956, Serial No. 574,915

2 Claims. (Cl. 240—78)

Our invention comprises a recessed lighting fixture, and, more specifically, a lighting fixture which is set in a ceiling or wall so that only the trim frame cover extends from the ceiling or wall.

In general, our invention comprises a metallic housing which has a junction box attached thereto so that the junction box can be moved into the inside of the main housing. By means of this type of construction our invention can be used in old buildings where remodeling or reconstruction is being done. The reason for this is that a hole in the ceiling can be made which is only the size of the housing. Into this hole both the housing and the junction box can be inserted.

Most city and county building ordinances require that a junction box be used between the ordinary house wiring and a light fixture of this type. To comply with this code it is often necessary in remodeling a building to cut an extra large hole so that the junction box can be mounted and connected up with the ordinary wiring and then the housing set in place and wired to the junction box. It is an object of our invention to provide a unit construction of a junction box and light housing which can be inserted in a hole only large enough to insert the housing itself and still be able to position the junction box outside of the housing and spaced therefrom. This is accomplished by having one of the ends of the housing removable or hinged thereto, so that the junction box can be moved into the interior of the housing and the necessary connections made.

Another provision of most city and county building ordinances is that the junction box must be spaced from the housing so as to keep the temperature in the junction box to a considerably lower point than that in the light box. Prior recessed light fixtures attach the junction box on spacing supports to the exterior of the housing.

Often in remodeling work if this hole is made to just fit the perimeter of the housing there is no room between the floor above and the ceiling to place the housing in a tilted condition and thus shove the junction box in ahead of the housing. Therefore by having the junction box attached as in our invention to the housing so that it can be dropped into the interior of the housing during the positioning of the housing in the ceiling, the junction box can then be moved into position between the ceiling and the upper floor without extra holes being cut into the ceiling and at the same time it can be wired and positioned without other apertures in the ceiling.

Other objects and advantages of our invention will be apparent from the following description of the preferred embodiments thereof.

In the drawings:

Figure 1 is an end view of our recessed lighting fixture taken from the junction box end.

Figure 4 is an exploded perspective of details.

Figure 5 is a section taken on line 6—6 on Figure 1.

Figure 6 is a perspective of a modification.

Figure 2:
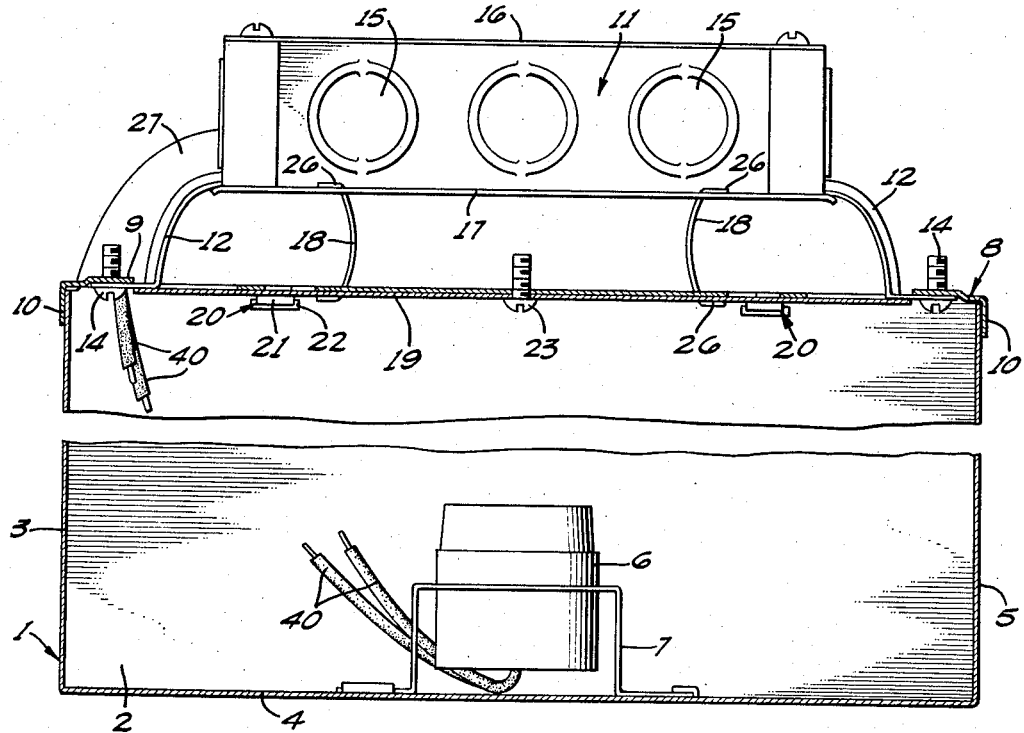
Figure 2 is a section taken on line 2—2 on Figure 1.
Figure 3:
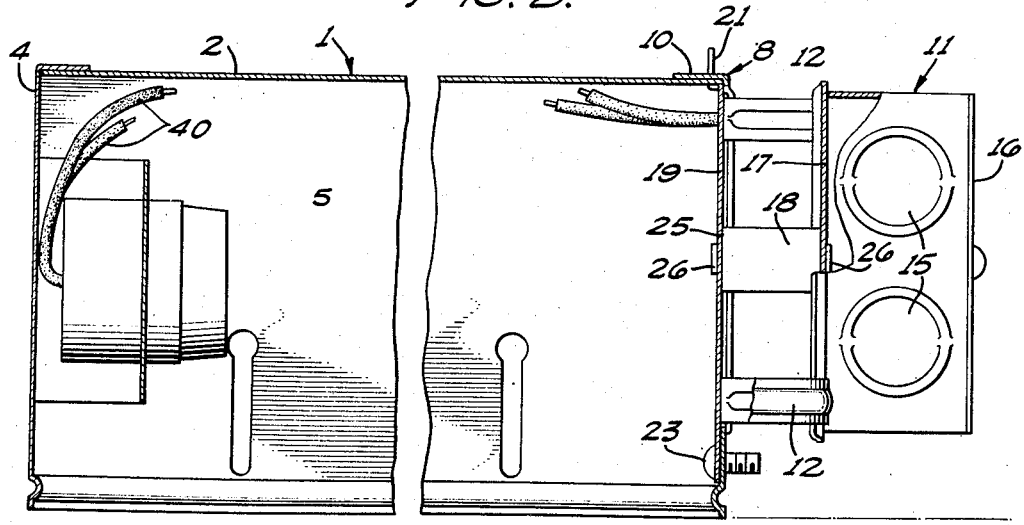
Figure 3 is a section taken on line 3—3 on Figure 1.

A recessed lighting fixture constructed in accordance with our invention comprises a housing generally indicated at 1, having a top plate 2 and downwardly extending walls 3, 4 and 5 enclosing three sides to form a box-like chamber. On wall 4 an electric light globe socket 6 is attached by a bracket 7. As the means of attaching the light socket 6 does not comprise any part of the present invention it can be attached in any of the well-known manners.

The fourth side of the housing 1 comprises a frame 8 having a rectangular opening 9. The frame 8 is attached to the sides 3 and 5 by flanges 10 extending around the sides 3 and 5 and being either welded of bolted thereto. A junction box 11 is attached to the frame 7 by means of spacing supports 12. The spacing supports 12 are attached by the screws 14 to the frame 8.

The particular junction box 11 as used in our invention has the usual punch-out holes 15 in its ends and sides and a screwed-on-plate 16 to cover the outer surface. The inner surface of the junction box adjacent to the housing 1 is open but is provided with a closure door 17. The closure door 17 is attached by compression springs 18 to a door 19 which is attached to the housing 1 by means of the hinge members 20. The hinge members 20 comprise a stud 21 extending from the door 19 up through slots 22 in the top 2 of the housing 1. The door 19 forms a closure for the opening 9 when the studs 21 are inserted in the slots 22 and it is held in position by a screw 23 passing through a bayonet slot into the frame 8. Any type of fixture, such as a latch or hook could be used to secure the bottom end of the door 19 to the frame 8. When the door 19 is thus sealed in position by the hinges 20 and the screw 23 it forces the closure door 17 into engagement with the junction box 11 and thus seals the junction box 11.

Springs 18 compress the closure door 17 against the junction box 11 as they are formed of arcuate members having shoulders 25 to exert pressure against the outside of both the doors 17 and 19 and tongues 26 which pass through slots in the doors 17 and 19 and are bent over into engagement with the inner surfaces of the doors.

To provide a metal protected passage for the connecting wires from the junction box to the light socket, one of the spacing supports 12 is formed not only as an arcuate arm but has placed over it a sleeve member 27, which provides a passage-way from the junction box to the interior of the housing 1 for the connecting wires.

Another example of our invention is shown in Figure 6 in which the same junction box 11 and housing 1 as heretofore described are provided. The open end has a single plate 30 which is hinged to the side of the box by lugs and slots similar to 21 and 22. Attached to the sides of the housing 1 and extending around over the open end is a lug 31. Screws passing through the plate 30 into the lugs 31 provide a means of fastening the plate 30 to close the housing 1. The junction box 11 is attached to the plate 30 by means of spacing supports 32 which are welded both to the plate 30 and the junction box 11 to form an integral unit. The junction box 11 has its inner side permanently attached to the box.

To install our box in a ceiling, a hole no larger than the housing 1 need be provided. In installing the first type of our invention the housing 1 without the junction box 11 and the door 19 is positioned in the ceiling. The house wiring is then pulled through the opening 9 into the interior of the housing 1 and connected in the junction box 11 to the wires 40 that lead to the light socket 6. The junction box 11 is then pushed out through the opening 9 and fastened in position by means of the screws 14 to the frame 8. The junction box and housing 1 are then closed by inserting the studs 21 on the door 19 into the slots 22 and then sealed there by the screw 23 as the closure door for the junction box is attached to the door 19. When this is done the junction box is sealed on its open side and is supported and spaced from the housing 1.

To install the second form of our invention, the housing 1 is inserted in the same hole as previously described. During the insertion of the housing 1 the plate 30 is swung inwardly into the housing 1 which causes the junction box to swing into the housing 1. The house wiring may then be drawn into the housing 1 and by removal of the outer cover 45 of the junction box it can be wired into the junction box and connected to the hookup wires 40. Merely closing the plate 30 spaces the junction box 11 outside of the housing 1 in its operating position and it is held in place when the plate 30 is closed and screwed to the lugs 31.

We claim:

1. In a recessed lighting fixture, a housing in which an electric light is mounted, one end of said housing being removable from the inside of said housing, a junction box spaced outside of said housing and attached to said housing by means permitting said junction box to be moved into said housing when said end is removed, a cover for the side of said junction box adjacent to said housing, spring members attached to said removable end and to said cover to support said cover in spaced relation to said removable end, said spring members having a length sufficient to hold said cover tightly against and to close said junction box when said removable end is in its closed position.

2. In a recessed lighting fixture a housing in which an electric light is housed, one end of said housing being hinged to rotate into said housing, a junction box spacedly attached to said housing, means for detaching said junction box and moving said junction box into said housing whereby electrical connections may be made to said junction box, a cover for said junction box, spring members attached to said rotatable end and to said cover to support said cover in spaced relation to said rotatable end, said spring members having a length sufficient to hold said cover tightly against and to close said junction box when said rotatable end closes said housing.

References Cited in the file of this patent

UNITED STATES PATENTS

| | | |
|---|---|---|
| 2,532,528 | Zuley | Dec. 5, 1950 |
| 2,561,986 | Jones | July 24, 1951 |
| 2,717,955 | Schwemmer et al. | Sept. 13, 1955 |